US012769407B1

(12) United States Patent
Yakimov

(10) Patent No.: US 12,769,407 B1
(45) Date of Patent: Oct. 20, 2026

(54) MULTIFUNCTIONAL DEVICE COMBINING A WIRELESS COMPUTER MOUSE AND A CHARGING CASE FOR WIRELESS HEADPHONES

(71) Applicant: Pavel Anatolevich Yakimov, Krasnodar (RU)

(72) Inventor: Pavel Anatolevich Yakimov, Krasnodar (RU)

( * ) Notice: Subject to any disclaimer, the term of this patent is extended or adjusted under 35 U.S.C. 154(b) by 0 days.

(21) Appl. No.: 19/373,884

(22) Filed: Oct. 30, 2025

(30) Foreign Application Priority Data

Sep. 7, 2025 (RU) ................................ 2025124619

(51) Int. Cl.
*G06F 3/0354* (2013.01)
*G06F 3/038* (2013.01)
*H02J 7/70* (2026.01)
*H04R 1/1025* (2026.01)

(52) U.S. Cl.
CPC ........ *G06F 3/03543* (2013.01); *G06F 3/0383* (2013.01); *H02J 7/731* (2026.01); *H04R 1/1025* (2013.01)

(58) Field of Classification Search
CPC .... G06F 3/03543; G06F 3/0383; H02J 7/731; H04R 1/1025
See application file for complete search history.

(56) References Cited

U.S. PATENT DOCUMENTS

| | | | | |
|---|---|---|---|---|
| 11,172,101 | B1 * | 11/2021 | Boozer | H04N 23/51 |
| 12,572,225 | B1 * | 3/2026 | Spackman | G06F 3/03543 |
| 2007/0200824 | A1 * | 8/2007 | Choo | G06F 3/03543 345/163 |
| 2009/0244007 | A1 * | 10/2009 | Chang | G06F 3/03543 345/163 |
| 2021/0185424 | A1 * | 6/2021 | Kowalk | G01R 31/382 |

* cited by examiner

*Primary Examiner* — Jonathan A Boyd
(74) *Attorney, Agent, or Firm* — Nadya Reingand

(57) ABSTRACT

A multifunctional device combining a wireless computer mouse and a charging case for headphones is provided. The device housing is made of two parts hingedly connected such that they are fixed in a closed position through a horizontal axis integrated into mating surfaces of the parts on the side where the mouse slides. The mouse control elements are in one or both parts, and a cradle for the headphones with a power supply system is in the second part. The device comprises a detachable contact connection configured to: power the mouse components and charge the headphones when the housing is closed; cut off power to the mouse components and continue charging the headphones when the housing is open and the headphones are in the cradle; cut off power to the mouse components and activate the Bluetooth modules when the housing is open and the headphones are removed from the cradle.

9 Claims, 2 Drawing Sheets

MULTIFUNCTIONAL DEVICE COMBINING A WIRELESS COMPUTER MOUSE AND A CHARGING CASE FOR WIRELESS HEADPHONES

TECHNICAL FIELD

The invention relates to the field of computing technology and consumer electronics, namely to multifunctional devices that combine the functions of a computer mouse and a portable charging case for storing and charging wireless (TWS) headphones.

BACKGROUND OF THE INVENTION

CN 212623992 (published Feb. 26, 2021) describes a device comprising a mouse body having an integrated charging compartment for TWS headphones under a removable magnetic cover, contact groups for transferring power from a mouse battery to the headphones, and a charging status indicator. The charging compartment is located at the rear of the body, separate from a control area.

The disadvantages of this device include the lack of integration of the mouse controls with the charging case, the need to completely remove the cover to access the headphones, and the lack of automatic mode switching when changing the device configuration.

CN 113473289 U (published Oct. 1, 2021) discloses an integrated mouse and wireless-headphone design that comprises a mouse body having a top compartment for headphones, mechanical spring latches, a separate sealing slider-lid, and independent Bluetooth modules. Removing the headphones requires multiple steps of manipulation of the latches and sliding the lid.

The disadvantages of this design include the difficulty of removing the headphones due to the mechanical latches and separate power controls for the mouse and the headphones.

CN 211209899 U (published Aug. 7, 2020) describes a device combining a wireless mouse and a charging case for TWS headphones located at the bottom of the body under a removable panel, with magnetic attachment of the headphones and a separate USB-C charging port.

The disadvantages of this analogue include the difficulty of removing the headphones due to the need to flip the device over to access them, the lack of a hinge mechanism, and manual power control.

US 2021185424 A1 (published Jun. 17, 2021) discloses a device comprising a mouse body having a pull-out tray for wirelessly charging headphones, a controller for distributing power between batteries and charge level sensors, wherein the tray mechanically extends from the bottom of the body.

The disadvantages of this design include the difficulty of removing the headphones due to the need to flip the device over to access them, the lack of automatic shutdown of the mouse components when removing the headphones, and the mechanical and electrical isolation of the charging compartment from the control system.

SUMMARY OF THE INVENTION

The objective of the invention is to create a multifunctional device combining a wireless mouse and a charging case for TWS headphones in a single folding housing with a hinged joint, which provides automatic mode switching when changing configurations, ensuring the headphones operate when removed, energy efficiency by deactivating the device's functional components when opened, and synchronized power management via detachable contacts.

The proposed invention, when implemented, enables achievement of the technical results consisting in increasing the speed of access to the headphones, optimizing energy consumption by automatically powering off the device's functional components when opened, seamlessly integrating the mouse and headphone charging functions through a single power supply while eliminating mechanical stress on the electrical contacts, thereby increasing the overall reliability of the device.

The following section of the description provides detailed information regarding the embodiments of the invention, demonstrating the feasibility of achieving the above technical results.

In order to achieve the above technical results, a multifunctional device is proposed that combines a wireless computer mouse and a charging case for headphones equipped with autonomous Bluetooth modules. The device comprises a housing made of two parts hingedly connected such that the two parts are fixed in a closed position through a horizontal pivot axis integrated into the mating surfaces of the first and second parts on the side of the sliding plane of the mouse. The functional components are made in such a way that the mouse control elements, which are made at least in the form of control buttons, a scroll element and an optical sensor, are located in one or both parts of the housing, and a cradle for the headphones with a power supply system comprising a battery and an external power interface is placed in the second part. The device comprises a detachable contact connection with contact groups located on the mating surfaces of the first and second parts. The detachable contact connection is configured to: power the functional components of the mouse and charge the headphones from the battery when the housing is in the closed position; cut off power to the components of the mouse and continue charging the headphones when the housing is in an open position and the headphones are placed in the cradle; and cut off power to the components of the mouse and activate the autonomous Bluetooth modules of the headphones when the housing is in the open position and the headphones are removed from the cradle.

Thus, the housing, which is formed by the two parts hinged via the horizontal pivot axis integrated into the mating surfaces of the parts on the side of the sliding plane of the mouse, improves access to the headphones, since opening the charging case requires only one hand of a user: the thumb holds the first part of the housing, while the other fingers and a part of the palm rest on the second part, allowing angular rotation of the first part and thereby accessing the headphones. The detachable contact connection with the contact groups located on the mating surfaces of the first and second parts eliminates the need to route wires through the hinge axis, preventing wearing-out of the wires during cyclic bending and ensuring a long service life, thereby increasing the reliability of the device. Moreover, the interaction of the hinge mechanism and the detachable contacts creates conditions for automatic switching between modes: when the housing is opened, the contact groups open, resulting in a power cutoff for all mouse components, which ensures the primary optimization of the device's power consumption while maintaining the ability to charge the headphones. The activation of the autonomous Bluetooth modules of the headphones, which occurs only when the headphones are removed from the cradle, eliminates their idle operation and further contributes to energy efficiency.

According to the invention, the hinge mechanism can be located along the long or short side of the mouse, or diagonally.

The detachable contact connection can be spring-loaded or magnetic.

The external power interface can be implemented as a USB Type-C connector and further includes a wireless charging module.

The device may further comprise a housing opening angle sensor configured to cut off power to the functional components of the mouse and charge the headphones when a predetermined angle is reached.

The hinge joint preferably includes magnetic elements for securing the housing in the closed position.

The scroll element can be made as a touch-sensitive or roller-type element.

The device can also include LED indicators displaying a charging status of the headphones and a status of the mouse.

BRIEF DESCRIPTION OF THE DRAWINGS

For a more complete understanding of the essence, the description provides references to explanatory FIGS. 1-3, in which.

DETAILED DESCRIPTION OF THE INVENTION

A preferred embodiment of the invention is described below with reference to the accompanying drawings. It will be apparent to those skilled in the art that the description and examples provided are illustrative in nature and do not limit the scope of legal protection, which is defined solely by the claims. Modifications and alternative embodiments are possible within the essence of the claimed technical solution.

Figure 1:
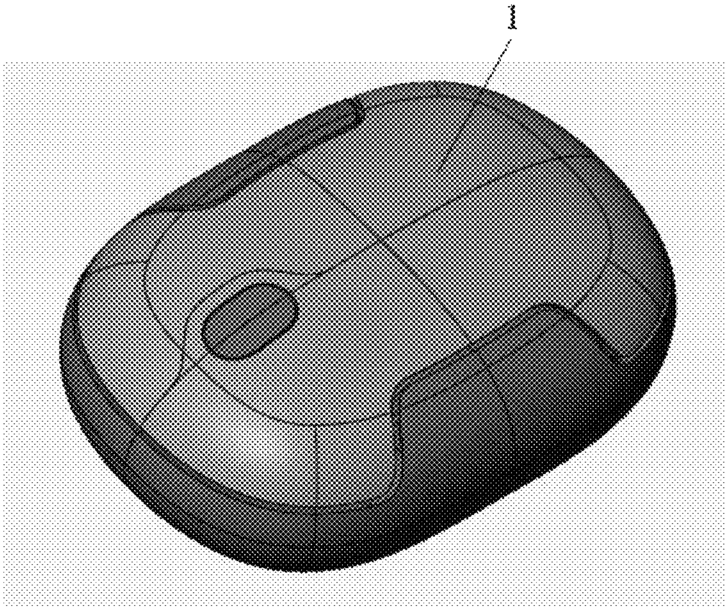
FIG. 1 shows a general view of a multifunctional device in a closed position according to a specific embodiment.
Figure 2:
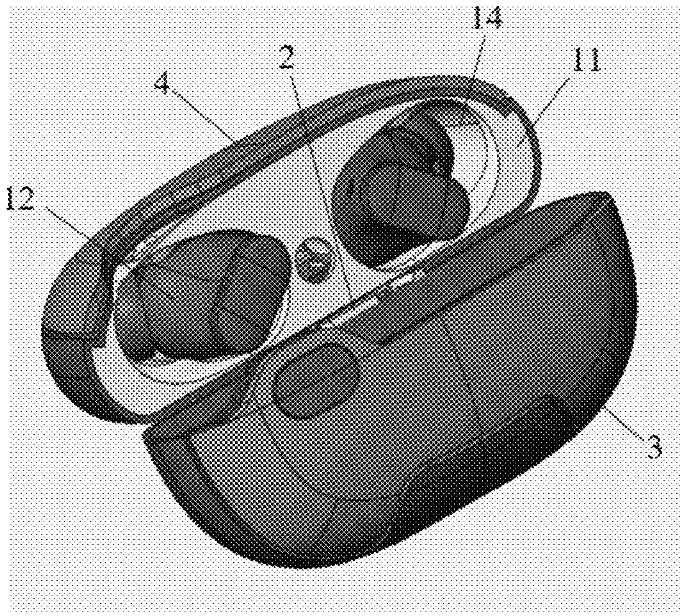
FIG. 2 shows a general view of the multifunctional device in an open position according to the specific embodiment.
Figure 3:
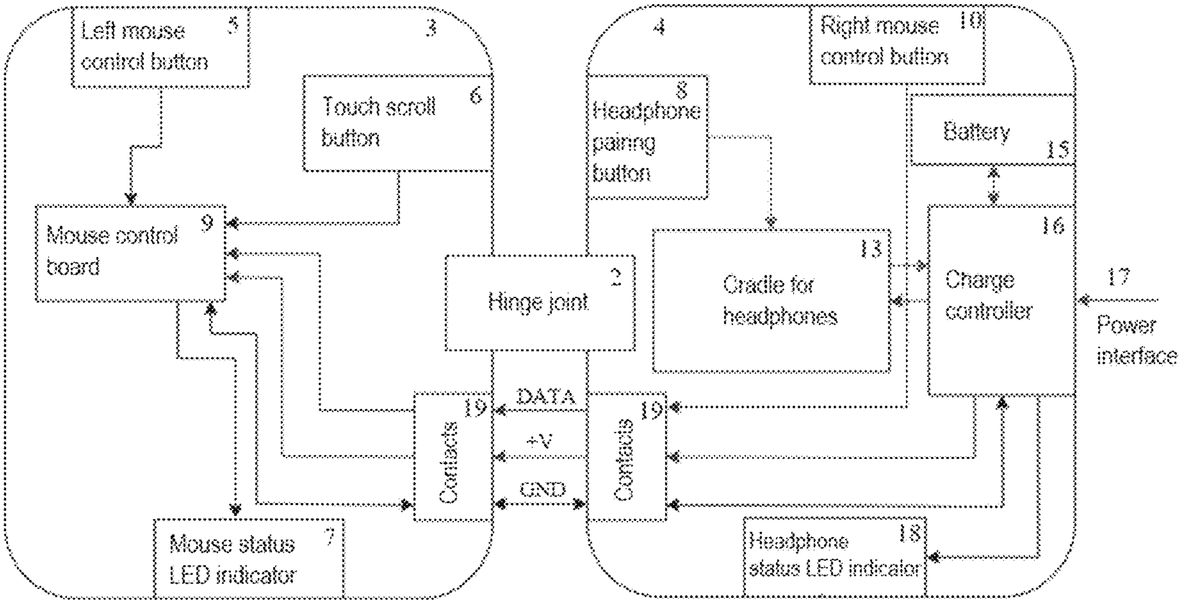
FIG. 3 shows a structural block diagram of the multifunctional device with indication of its functional modules according to the specific embodiment.

The multifunctional device shown in FIGS. 1-3 that combines a wireless computer mouse and a charging case for headphones has a folding housing 1 (FIG. 1) divided by a hinge joint 2 (FIG. 2) into two functional parts 3, 4. The first part 3 comprises computer mouse controls (FIG. 3), a left control button 5, a scroll element 6 that provides gesture control (sliding up/down and scrolling a document), as well as a mouse status LED indicator 7. There is an optical sensor window on the lower plane of the part 3, which is surrounded by Teflon inserts (not shown in the explanatory figures) to ensure smooth sliding of the mouse over surfaces. A mouse control board 9 that processes control signals is placed inside the part 3.

The part 4 of the device comprises a right control button 10 of the mouse and an integrated charging case 11 (FIG. 2) for headphones 12, which comprises a magnetic cradle 13 (FIG. 3) (for example, made of neodymium alloy) including, for example, two charging chambers 14 (FIG. 2) (or alternatively one) corresponding to the dimensions of the headphones 12, a lithium-ion battery 15 (FIG. 3), a charge controller 16 and a combined power interface 17 in the form of a USB Type-C connector, or a combination of a USB Type-C connector and an inductive coil of the Qi standard (not shown in the explanatory figures), as well as a tact pairing button 8 operatively connected to the charging case 11 and intended for the initial pairing of the headphones 12 with a new audio device.

There is an on/off button (not shown in the explanatory figures) on the lower plane of one of the parts 3, 4, which is a two-position switch that activates charging of the headphones 12 from the battery 15 and power to the mouse when it is in an ON position, and completely de-energizes the device when it is in an OFF position.

The hinge joint 2 (e.g., made of stainless steel) is located on a horizontal axis with an opening range of up to 180°. Spring-loaded contacts 19 (e.g., pogo pins) are located on the mating surfaces of the parts 3, 4 outside the hinge area and form three independent contact pairs: two pairs for transmitting power (in this case, for the supply voltage +V and the common wire GND which completes the circuit and serves as a return path for current to the battery) to the components of the mouse, and one pair for data synchronization (DATA).

When the housing 1 is in the closed position and the on/off button is set to the ON position, the contact pairs close, activating the device's full functionality. Power from the battery 15 is supplied to the control board 9, where the optical sensor tracks movements, converting them into signals transmitted, for example, via Bluetooth 5.0 to a controlled computer. Simultaneously, when the headphones 14 are placed in the cradle 13 of the charging case 11, their charging contacts close, initiating the charging process under the control of the charge controller 16 which automatically stops charging when the battery reaches full capacity. LED indicators visualize the status: the mouse status LED indicator 7 confirms the mouse activity, and a headphone status LED indicator 18 indicates the charging process of the headphones 12.

Opening the housing by a user leads to the opening of the power contact groups and the immediate shutdown of all components of the mouse: the optical sensor, the control buttons 5, 10, the scroll element 6 and the LED indicator 7. The headphone charging system, however, remains operational—the charging contacts of the cradle 13 continue to supply power to the headphones 12 while they are in the case 11, even when the housing is in the fully open position. The autonomous Bluetooth modules of the headphones are activated when the headphones are removed from the cradle 13, enabling a direct connection to an audio source. Alternatively, the activation of the Bluetooth modules can be initiated manually on the headphones, allowing the user to manually enable Bluetooth, for example, by pressing a touch button on the body of the headphone/headphones.

Closing the housing restores power to the mouse by closing the contact pairs and secures the structure with magnets.

In practice, the user working on a computer with the housing closed uses the mouse to control a cursor, while the headphones 12 (if present) are charged in the case 11. When an incoming call arrives, opening the housing with one hand instantly deactivates the mouse, allowing the headphones to be removed to establish an audio connection. After the call ends, the headphones can be returned to the cradle 13, but the housing maintains the mouse functionality even without the headphones—closing the housing automatically resumes the mouse operation in both cases.

Alternative designs may include self-closing magnetic contacts (e.g., based on SmCo alloy) and support for wireless charging of the entire device via Qi induction charging stations.

The proposed multifunctional device provides an optimal combination of the functionality of the computer mouse and the charging case for the headphones.

The claimed invention is novel because the set of its essential features is not known from the prior art and, accordingly, meets the patentability requirement of "novelty".

The information presented herein allows a skilled person to implement the invention using the specified means and methods, and the described advantages of the invention are objectively evident and do not clearly follow from the prior art.

The invention claimed is:

1. A multifunctional device combining a wireless computer mouse and a charging case for headphones equipped with autonomous Bluetooth modules, the device comprising:

a housing made of two parts hingedly connected such that the two parts are fixed in a closed position through a horizontal pivot axis integrated into mating surfaces of the first and second parts on a side of a sliding plane of the mouse;

wherein functional components are made in such a way that control elements of the mouse, which are made at least as control buttons, a scroll element and an optical sensor, are located in one or both parts of the housing, and a cradle for the headphones with a power supply system comprising a battery and an external power interface is placed in the second part;

wherein the device comprises a detachable contact connection with contact groups located on the mating surfaces of the first and second parts;

wherein the detachable contact connection is configured to:

power the functional components of the mouse and charge the headphones from the battery when the housing is in the closed position;

cut off power to the components of the mouse and continue charging the headphones when the housing is in an open position and the headphones are placed in the cradle; and cut off power to the components of the mouse and activate the autonomous Bluetooth modules of the headphones when the housing is in the open position and the headphones are removed from the cradle.

2. The device of claim 1, wherein a hinge mechanism is located along a long or short side of the mouse, or diagonally.

3. The device of claim 1, wherein the detachable contact connection is spring-loaded or magnetic.

4. The device of claim 1, wherein the external power interface is implemented as a USB Type-C connector.

5. The device of claim 4, wherein the external power interface includes a wireless charging module.

6. The device of claim 1, further comprising a housing opening angle sensor configured to cut off power to the functional components of the mouse and charge the headphones when a predetermined angle is reached.

7. The device of claim 1, wherein a hinge joint includes magnetic elements for securing the housing in the closed position.

8. The device of claim 1, wherein the scroll element is made as a touch-sensitive or roller-type element.

9. The device of claim 1, further comprising LED indicators displaying a charging status of the headphones and a status of the mouse.

* * * * *